(12) United States Patent
Thompson et al.

(10) Patent No.: US 6,487,216 B1
(45) Date of Patent: Nov. 26, 2002

(54) MANAGEMENT OF A TELECOMMUNICATIONS SYSTEM

(75) Inventors: Jonathan Andrew Thompson, Newbury (GB); Michelle Rohan, Meath (IR); Liam Martin Quilty, Waterford (IR)

(73) Assignee: Airspan Networks, Inc., Seattle, WA (US)

( * ) Notice: Subject to any disclaimer, the term of this patent is extended or adjusted under 35 U.S.C. 154(b) by 0 days.

(21) Appl. No.: 09/273,111

(22) Filed: Mar. 19, 1999

(30) Foreign Application Priority Data

Mar. 20, 1998 (GB) ............................................ 9806070

(51) Int. Cl.[7] ........................ H04L 12/24; G06F 15/177

(52) U.S. Cl. ...................................... 370/466; 709/223

(58) Field of Search ................................ 370/216, 351, 370/352, 254, 466, 248; 369/223

(56) References Cited

U.S. PATENT DOCUMENTS

| | | | | |
|---|---|---|---|---|
| 5,764,955 A | * | 6/1998 | Doolan ........................ | 709/223 |
| 5,881,051 A | * | 3/1999 | Arrowood et al. .......... | 370/248 |
| 6,058,120 A | * | 5/2000 | Sabzevari ................... | 370/466 |

FOREIGN PATENT DOCUMENTS

| | | | | |
|---|---|---|---|---|
| WO | 9520297 | 7/1995 | ............ | H04Q/3/00 |
| WO | 9534974 | 12/1995 | ........... | H04L/12/24 |

OTHER PUBLICATIONS

"User Interface Design for SONET Networks", Aug. 1992, IEEE Communications Magazine by Masao Hibino and Frank Kaplan.*
"Sonet and OSI: Making a Connection", Nov. 1991, IEEE LTS by Christopher Day and Chi–Ho Lin.*
"SONET: a Network Management Viewpoint"Nov. 1990, IEEE LCS, by Rony Holter.*
"OSS X.25 Design for SONET", 1996, Communcation Technology Proceedings (ICCT '96) by Tain–Lieng Kao, Shi–Wei Lee, Kou–Tan Wou and Yuan–Sun Chu.*
PCT Search Report, dated Jul. 5, 1999.

* cited by examiner

Primary Examiner—Salvatore Cangialosi
(74) Attorney, Agent, or Firm—Baker Botts L.L.P.

(57) ABSTRACT

The present invention provides a management system and method for a telecommunications system, the telecommunications system having a plurality of objects representing elements of the telecommunications system and/or operations that may be applied to those elements. The management system comprises a management controller connectable to an item of telecommunications equipment of the telecommunications system for passing messages over a communications link between the management controller and a management element of the telecommunications system to invoke management operations. Further, the management system comprises means for defining a number of messages which may be generated by the management controller or the management element for passing over the communications link, each message being arranged to include one or more information elements. At least one of the messages is arranged to identify one of said objects as an information element and to cause different management operations to be invoked dependent on the object identified.

By this approach, a separate message is not required for each management operation, and instead particular management operations can be invoked by virtue of the object specified within a particular message. This enables a simple generic interface to be provided between the management system and the telecommunications system that is independent of the particular management functions that need to be performed on any particular telecommunications system. Hence, this enables the management system to be readily reused with different telecommunications systems without the requirement to alter the message interface between the management system and the telecommunications system.

12 Claims, 10 Drawing Sheets

MANAGEMENT OF A TELECOMMUNICATIONS SYSTEM

BACKGROUND OF THE INVENTION

1. Field of the Invention

The present invention relates generally to the management of a telecommunications system, and more particularly to management systems and methods for interfacing with the telecommunications system to perform management functions.

2. Description of the Prior Art

In a typical telecommunications system, a subscriber terminal may be located at a subscriber's premises for handling calls to and from that subscriber. One or more lines may be provided from the subscriber terminal for supporting one or more items of telecommunications equipment located at the subscriber's premises. Further, a central terminal may be provided for controlling a number of subscriber terminals, and in particular for managing calls between a subscriber terminal and other components of a telecommunications network.

As the number of users of telecommunications networks increases, so there is an ever increasing demand for such networks to be able to support more users. As techniques are developed to enable such systems to support more and more subscriber terminals, and hence more users, then it is clear that the telecommunications systems become more complex, and that thus the issue of managing such telecommunications systems becomes more complicated.

As the number of elements in the telecommunications system increases, then clearly the volume of management information to be handled will tend to increase. For example, the various elements within the telecommunications system will need to be configured, and hence configuration information will have to be distributed to those elements. Further, management functions such as the management of alarms generated by the elements of the telecommunications system, and the downloading of software to the telecommunications system, will need to be implemented.

It is known to provide a management system, such as an element manager, to handle the various management functions. Typically, the management system would be arranged to establish a connection with an item of telecommunications equipment, for example a central terminal, and to then initiate the various management functions. However, as the size of the telecommunications system increases, and hence more and more elements need to be managed, then the variety of management information and functions which must be passed over the communications link between the element manager and the telecommunications system tends to become quite large, resulting in a complex interface being required between the management system and the telecommunications system.

It is hence an object of the present invention to provide an improved technique for managing a telecommunications system.

SUMMARY OF THE INVENTION

Viewed from a first aspect, the present invention provides a management system for a telecommunications system, the telecommunications system having a plurality of objects representing elements of the telecommunications system and/or operations that may be applied to those elements, the management system comprising: a management controller connectable to an item of telecommunications equipment of the telecommunications system for passing messages over a communications link between the management controller and a management element of the telecommunications system to invoke management operations; means for defining a number of messages which may be generated by the management controller or the management element for passing over the communications link, each message being arranged to include one or more information elements; at least one of the messages being arranged to identify one of said objects as an information element and to cause different management operations to be invoked dependent on the object identified.

In accordance with the present invention, a management controller of the management system is arranged to establish a communications link with a management element of the telecommunications system so as to enable management operations to be invoked. Further, the management system has access to a number of messages which can be generated for passing over the communications link so as to invoke the management operations, each message being arranged to include one or more information elements. The telecommunications system has a plurality of objects representing elements of the telecommunications system and/or operations that may be applied to those elements, and, in accordance with the present invention, at least one of the messages is arranged to identify one of the objects as an information element and to cause different management operations to be invoked dependent on the object identified.

By this approach, a separate message is not required for each management operation, and instead particular management operations can be invoked by virtue of the object specified within a particular message. This enables the number of messages required to operate the interface between the management system and the telecommunications system to be drastically reduced, thereby significantly simplifying the interface between the management system and the telecommunications system. Furthermore, by this approach, it is possible to develop a generic interface between the management system and the telecommunications system that is independent of the particular management functions that need to be performed on any particular telecommunications system. Hence, this enables the management system to be readily reused with different telecommunications systems without the requirement to alter the message interface between the management system and the telecommunications system.

The objects provided by the telecommunications system can represent various entities. For example, at least one of the plurality of objects may represent an element of the telecommunications system. Further, at least one of the plurality of objects may represent an element of the telecommunications system and an operation to be applied to that element. It will also be apparent that the objects may represent other combinations of elements and/or operations. For example, an object may represent a single element and a group of operations to be applied to that element, or alternatively an object may represent a group of elements and an operation to be applied to that group of elements.

In preferred embodiments, said means for defining defines a first message that is arranged to include two information elements, a first information element identifying a particular object from said plurality of objects, and the second information element identifying object data to replace corresponding object data in the particular object. Hence, this message can be used to change the content of a particular object, and so for example may be used to alter configuration data of an object.

However, in preferred embodiments, the particular object identified by the first information element may represent an element of the telecommunications system and an operation to be applied to that element, the management controller being arranged to pass the first message over the communications link to the management element to invoke a management operation, the management operation invoked depending on the operation represented by the particular object. Hence, this first message can also be used to invoke a number of different management operations, the exact management operation being invoked depending on the operation represented by the particular object. This enables the same basic message to be used over the communications link between the management system and the telecommunications system, whilst the objects provided by the telecommunications system and referenced in the message determine the management function to be employed. Therefore, the message set for the interface between the management system and the telecommunications system can be developed independently of the structure of the telecommunications system, and of the management functions to be performed in respect of that telecommunications system.

In preferred embodiments, said means for defining defines a second message that is arranged to include an information element identifying one of said plurality of objects, receipt of the second message causing the identified object to be retrieved and output as an information element within a third message defined by said means for defining.

Further, in preferred embodiments, said means for defining defines a fourth message that is issued to acknowledge receipt of a message passed over the communications link. Preferably, the fourth message is issued if the message to be acknowledged by the fourth message could not be processed correctly, the fourth message including as an information element an indication of the processing problem. For example, the information element may specify that the message being acknowledged was sent to an unknown object, or, in the case of the first message, that the object data intended to replace the addressed object was of a size which did not correspond to the addressed object, etc.

In the simplest embodiment, the item of telecommunications equipment to which the management controller connects will also contain the management element. However, in alternative embodiments, the management controller is connectable to a first item of telecommunications equipment of the telecommunications system, and the management element of the telecommunications system resides on a second item of telecommunications equipment, and the messages are routed to and from the management element via a connection medium of the telecommunications system connecting the first and second items of telecommunications equipment. In such embodiments, the connection medium is preferably a backhaul used to transfer telecommunications signals between the first and second items of telecommunications equipment, a management slot being provided on the backhaul to facilitate transfer of the messages between the management element and the first item of telecommunications equipment.

Viewed from a second aspect, the present invention provides a telecommunications system, comprising: a storage for maintaining a plurality of objects representing elements of the telecommunications system and/or operations that may be applied to those elements; a management element for communicating over a communications link with a management system; and a management system in accordance with the first aspect of the present invention.

Viewed from a third aspect, the present invention provides a method of managing a telecommunications system, the telecommunications system having a plurality of objects representing elements of the telecommunications system and/or operations that may be applied to those elements, the method comprising the steps of: connecting a management controller to an item of telecommunications equipment of the telecommunications system; selecting a message from a number of messages, each message in the number of messages being arranged to include one or more information elements; passing the selected message over a communications link between the management controller and a management element of the telecommunications system to invoke a management operation; and invoking the management operation, at least one of the messages being arranged to identify one of said objects as an information element and to cause different management operations to be invoked dependent on the object identified.

BRIEF DESCRIPTION OF THE DRAWINGS

The present invention will be described further, by way of example only, with reference to a preferred embodiment thereof as illustrated in the accompanying drawings, in which.

DESCRIPTION OF PREFERRED EMBODIMENT

The present invention may be employed to manage any type of telecommunications system, for example a wired telecommunications system, or a wireless telecommunications system. Further, the present invention can be employed with a telecommunications system arranged to handle any type of telecommunications signal, for example a telephone signal, a video signal, or data signals such as those used for transmitting data over the Internet, or arranged to support new technologies such as broadband and video-on-demand technologies. However, for the purpose of describing a preferred embodiment of the present invention, a wireless telecommunications system will be considered that is used for handling telephony signals, such as POTS (Plain Old Telephony System) signals.

Before describing a preferred embodiment of the present invention, an example of such a wireless telecommunications system in which the present invention may be employed will first be discussed with reference to FIGS. 1 to 4.

Figure 1:
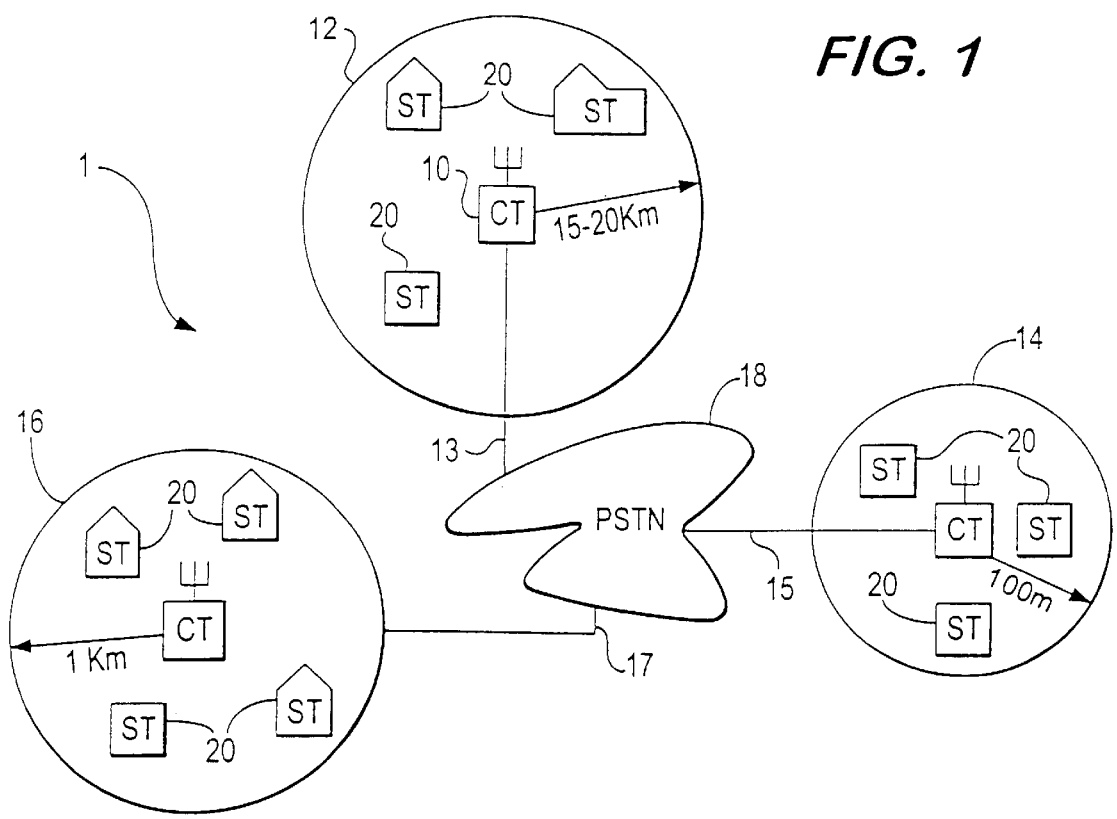
FIG. 1 is a schematic overview of an example of a wireless telecommunications system in which the present invention may be employed.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing radio links between subscriber terminals 20 at fixed locations within a service area (e.g., 12, 14, 16) and the central terminal 10 for that service area. These wireless radio links are established over predetermined frequency channels, a frequency channel typically consisting of one frequency for uplink signals from a subscriber terminal to the central terminal, and another frequency for downlink signals from the central terminal to the subscriber terminal.

Due to bandwidth constraints, it is not practical for each individual subscriber terminal to have its own dedicated frequency channel for communicating with a central terminal. Hence, techniques have been developed to enable data items relating to different wireless links (i.e. different ST-CT communications) to be transmitted simultaneously on the same frequency channel without interfering with each other. One such technique involves the use of a "Code Division Multiple Access" (CDMA) technique whereby a set of orthogonal codes may be applied to the data to be transmitted on a particular frequency channel, data items relating to different wireless links being combined with different orthogonal codes from the set. Signals to which an orthogonal code has been applied can be considered as being transmitted over a corresponding orthogonal channel within a particular frequency channel.

One way of operating such a wireless telecommunications system is in a fixed assignment mode, where a particular ST is directly associated with a particular orthogonal channel of a particular frequency channel. Calls to and from items of telecommunications equipment connected to that ST will always be handled by that orthogonal channel on that particular frequency channel, the orthogonal channel always being available and dedicated to that particular ST.

However, as the number of users of telecommunications networks increases, so there is an ever increasing demand for such networks to be able to support more users. To increase the number of users that may be supported by a single central terminal, an alternative way of operating such a wireless telecommunications system is in a Demand Assignment mode, in which a larger number of STs are associated with the central terminal than the number of traffic-bearing orthogonal channels available. These orthogonal channels are then assigned to particular STs on demand as needed. This approach means that far more STs can be supported by a single central terminal than is possible in a fixed assignment mode, the exact number supported depending on the level of dial tone service that the service provider desires. In preferred embodiments of the present invention, each subscriber terminal 20 is provided with a demand-based access to its central terminal 10, so that the number of subscribers which can be serviced exceeds the number of available wireless links.

Figure 2:
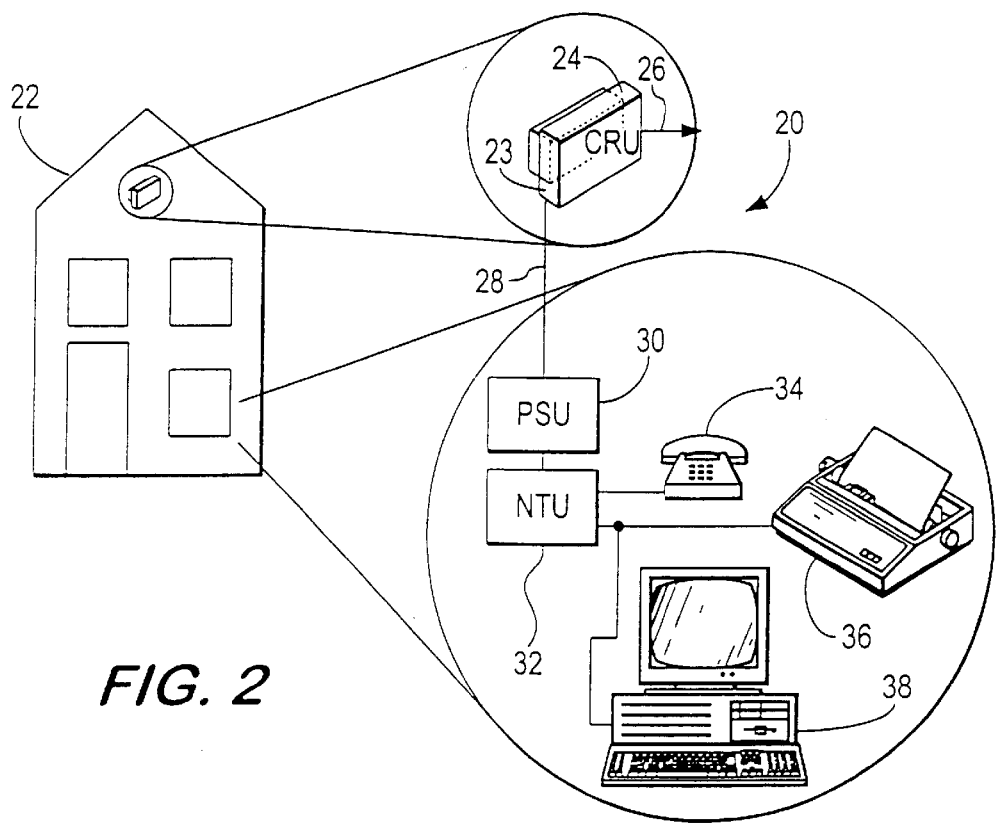
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 can support multiple lines, so that several subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
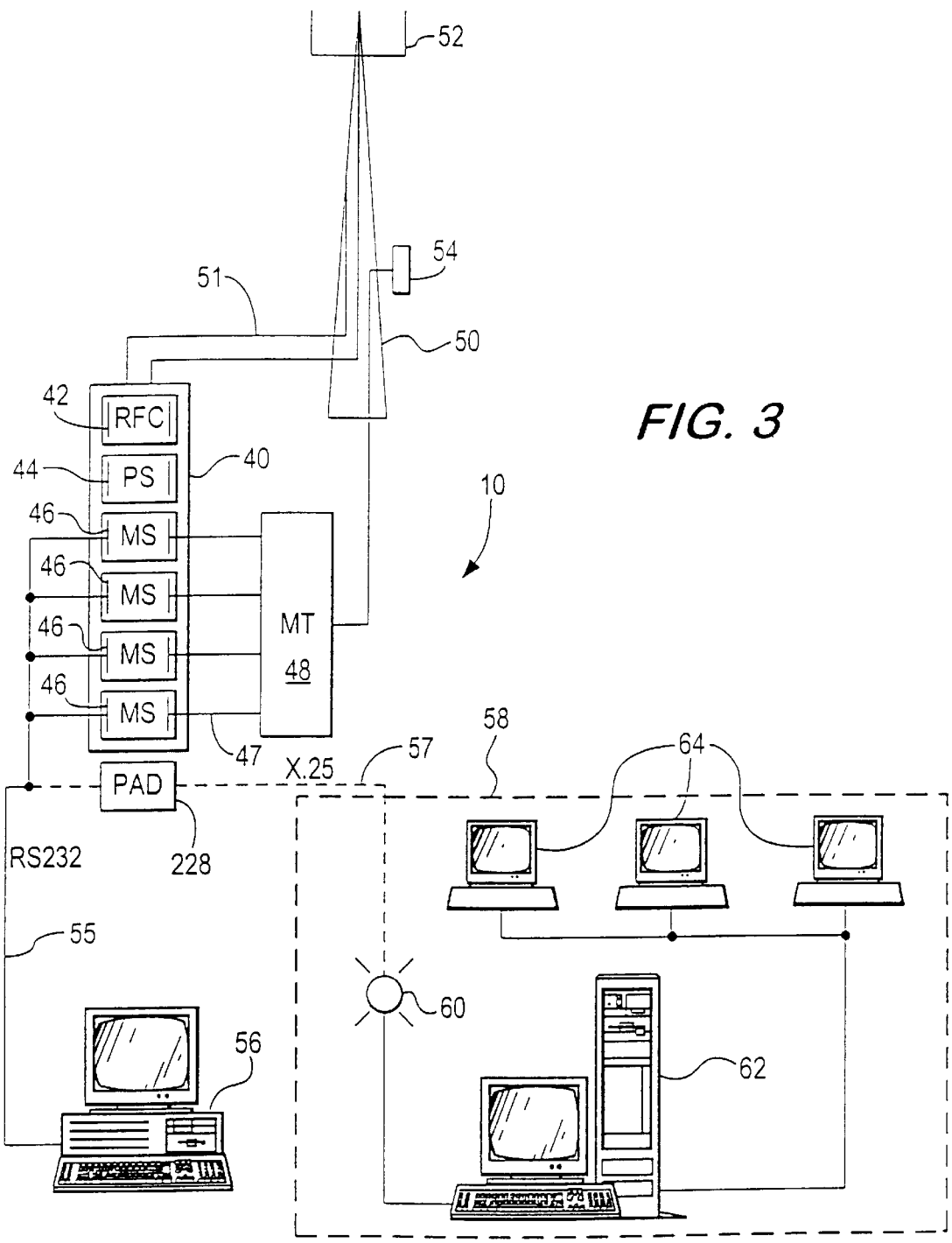
FIG. 3 is a schematic illustration of an example of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the modem shelves 46 to operate in parallel. If 'n' modem shelves are provided, then the RF combiner shelf 42 combines and amplifies the power of 'n' transmit signals, each transmit signal being from a respective one of the 'n' modem shelves, and amplifies and splits received signals 'n' way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, such as an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
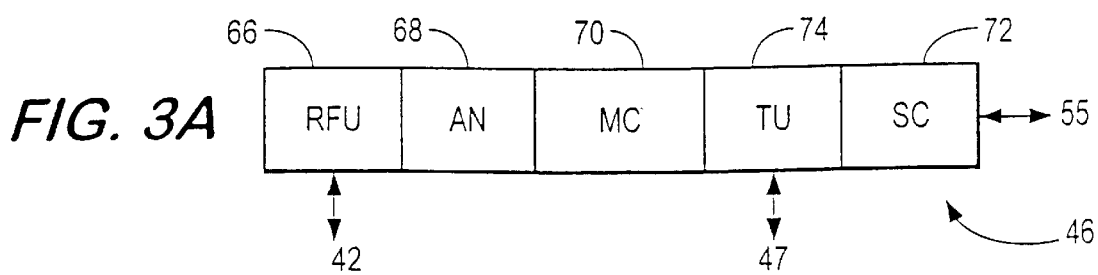
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of the various transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This may include ½ rate convolution coding and x16 spreading with "Code Division Multiplexed Access" (CDMA) codes on the transmit signals, and synchronisation recovery, de-spreading and error correction on the receive signals. The modem cards 70 are connected to the tributary unit (TU) 74 which terminates the connection to the host public switched telephone network 18 (e.g., via one of the lines 47) and handles the signalling of telephony information to the subscriber terminals via one of the modems. Further, each modem shelf 46 includes a shelf controller 72 that is used to manage the operation of the whole of the modem shelf and its daughter network sub-elements (NSEs). The shelf controller (SC) is provided with a RS232 serial port for connection to the site controller 56 or to the pad 228. The shelf controller communicates control and data information via a backplane asynchronous bus directly with the other elements of the modem shelf. Other network sub-elements are connected via the modem cards.

Figure 4:
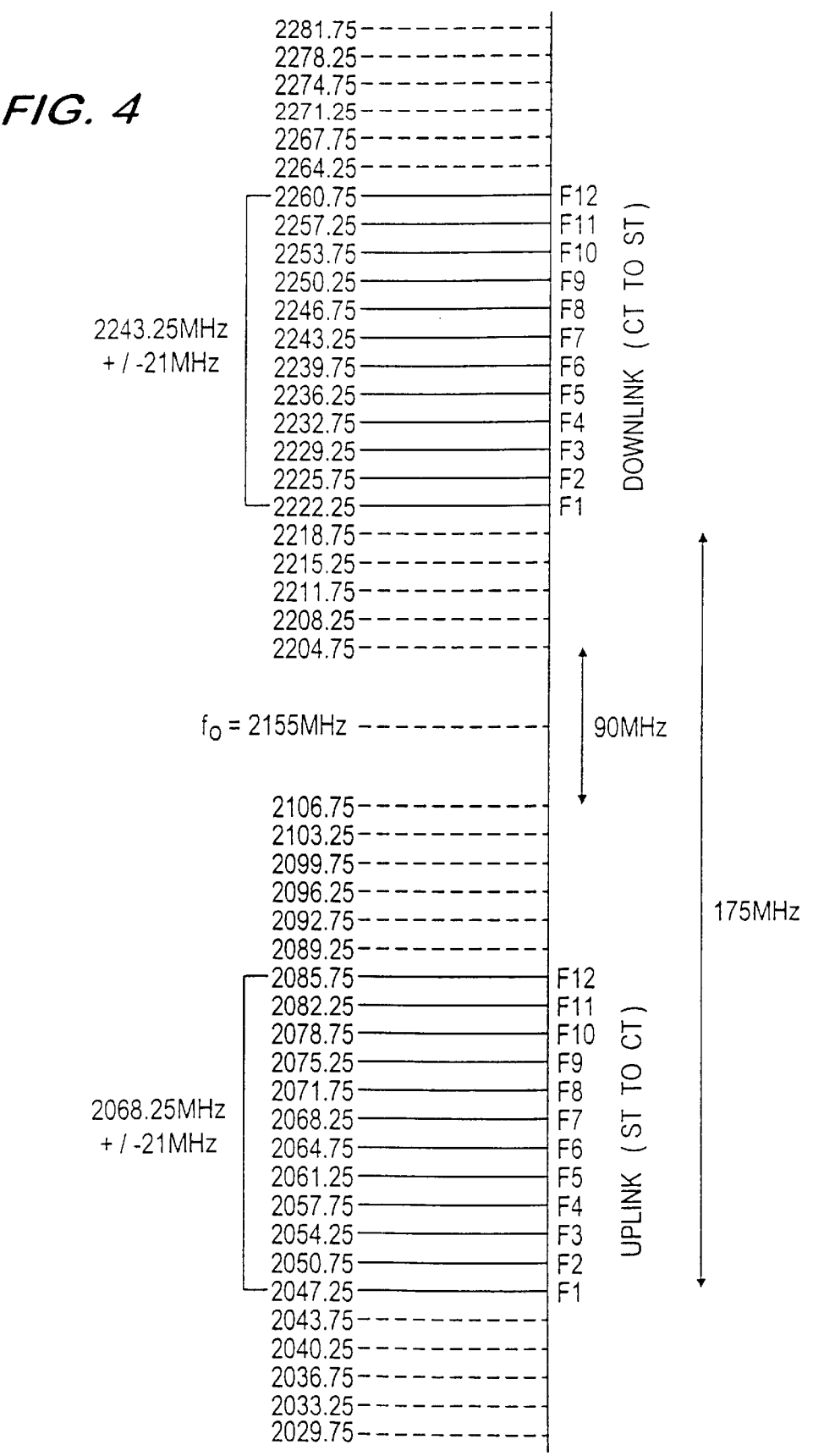
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, each modem shelf is arranged to support 1 frequency channel (i.e. one uplink frequency plus the corresponding downlink frequency), with techniques such as 'Code Division Multiplexed Access' (CDMA) being used to enable a plurality of wireless links to subscriber terminals to be simultaneously supported on a plurality of orthogonal channels within each frequency channel.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10. This is discussed in more detail in GB-A-2,301,751, which also provides further details on CDMA encoding/decoding, and on the signal processing stages employed in the subscriber terminals and central terminal to manage CDMA communications between them.

The above description has provided an overview of a suitable wireless telecommunications system in which the present invention may be employed. The techniques used in preferred embodiments of the present invention to manage the wireless telecommunications system will now be discussed.

As discussed earlier, in a Demand Assignment mode of operation, far more STs can be supported than there are traffic bearing channels to handle wireless links with those STs, the exact number supported depending on the level of dial tone service that the service provider desires.

However, the use of a Demand Assignment mode complicates the interface between the central terminal and the switch of a public switched telephone network (PSTN). On the switch side interface, the CT must provide services to the switch as though all of the subscribers are connected with direct service even though they may not be actually acquired to a radio frequency channel. Regardless of whether the ST is acquired or not to the switch, all of the subscribers must have a presence at the interface to the switch. Without some form of concentration, it is clear that a large number of interfaces to the switch would need to be provided. However, most PSTN switches still use unconcentrated interfaces, for example V5.1 or CAS, and only relatively few use concentrated interfaces, such as TR303 or V5.2.

To avoid each central terminal having to provide such a large number of interfaces to the switch, it is proposed to use an access concentrator, which transmits signals to, and receives signals from, the central terminal using concentrated interfaces, but maintains an unconcentrated interface to the switch, protocol conversion and mapping functions being employed within the access concentrator to convert signals from a concentrated format to an unconcentrated format, and vice versa. Such an access concentrator is illustrated in FIG. 5, which illustrates elements of the access concentrator and central terminal used to handle calls.

Figure 5:
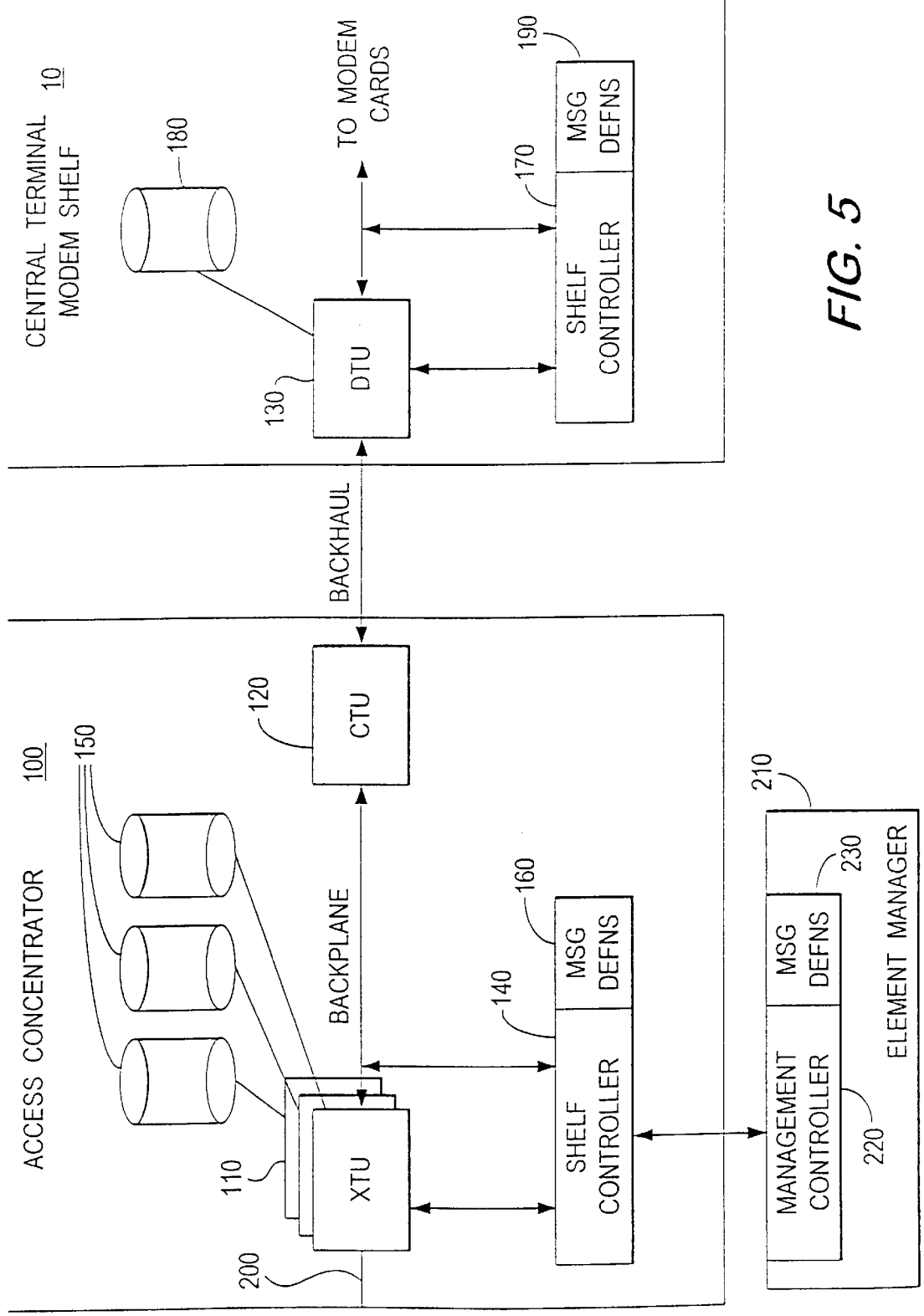
FIG. 5 is a block diagram showing elements of an access concentrator, a central terminal and an element manager in accordance with preferred embodiments of the present invention.

It will be appreciated by those skilled in the art that, although the access concentrator 100 is illustrated in FIG. 5 as a separate unit to the central terminal 10, and indeed this is the preferred implementation, it is also possible that the functions of the access concentrator could be provided within the central terminal 10 in situations where that was deemed appropriate.

As illustrated in FIG. 5, the Access Concentrator 100 has a number of tributary units 110, hereafter referred to as XTUs (Exchange (facing) Tributary Units), which provide an unconcentrated interface to the switch of a telecommunications network. When an incoming call is received over path 200 from the switch of a telecommunications network, then the XTU 110 receiving that call is arranged to determine from information associated with that incoming call which subscriber terminal line the incoming call is destined for, and to then use that information to access a database 150 associated with that XTU 110 in order to retrieve all of the necessary information about that subscriber terminal line to enable the call to be routed through the access concentrator to the central terminal and then over a wireless link to the subscriber terminal.

In preferred embodiments, the XTUs 110 are connected to the switch of the telecommunications network via E1 lines. The number of E1 lines required will depend on the number of subscriber terminal lines supported by the wireless telecommunications system, each subscriber terminal line having a dedicated time slot on a predetermined one of the E1 connections.

Once the necessary information has been retrieved by the XTU 110 from the database 150, then the XTU 110 is arranged to contact the tributary unit 120 within the access concentrator 100, hereafter referred to as the CTU 120 (Concentrator Tributary Unit), to request a call manager within the CTU 120 to determine a suitable path for directing the call over the backplane between the XTU 110 and the CTU 120, over the backhaul between the access concentrator 100 and the central terminal 10, and over the wireless link between the central terminal and the subscriber terminal to which the call is destined.

The exact mechanism used by the call manager to determine the path for routing the call between the access concentrator, the central terminal and the subscriber terminal is not relevant for the purposes of the present invention. However, a detailed discussion of a preferred technique for performing this process is described in detail in UK Patent Application No. 9712168.5 filed on Jun. 11, 1997.

However, in brief, the call manager preferably establishes a call object to represent the call, and then stores the information retrieved from the database 150 by the XTU as attributes of that call object. Further, the call manager preferably employs certain elements within the access concentrator and the central terminal to determine whether there is a radio slot available for carrying the call between the central terminal and the subscriber terminal. Herein, the term "radio slot" refers to the bandwidth elements into which each frequency channel is sub-divided, these radio slots being assigned to particular calls as required.

Once a radio slot has been allocated for the call, the call manager within the CTU 120 causes the addressed subscriber terminal to be invited to acquire the wireless link on that radio slot. Once the subscriber terminal has acquired the wireless link on the correct radio slot, then the call manager employs elements to allocate bearer time slots on the links of the concentrated backhaul interface between the access concentrator 100 and the central terminal 10, and on the concentrated backplane between the XTU 110 and the CTU 120 in the access concentrator 100.

The backplane and the backhaul are referred to as "concentrated", because the number of time slots provided are less than the actual number of subscriber terminals supported by the system. Hence, a bearer time slot is allocated dynamically as and when required. Hence, unlike the E1 connections between the XTUs 110 and the exchange switch, where data relating to a particular subscriber terminal line will always appear on a particular time slot of a particular E1 line, the data for a particular subscriber terminal line may appear on any free bearer time slots on the backplane and the backhaul, since these time slots are allocated dynamically at the time the call is initiated.

Once the above process has taken place, then the call can be routed from the XTU 110 over the backplane to the CTU 120, and from there over the backhaul to a tributary unit 130 within one of the modem shelves of the central terminal with which the subscriber terminal has established the wireless link, this tributary unit 130 being referred to as a DTU 130 (Demand Assignment Tributary Unit). As discussed earlier with reference to FIG. 3a, the data is then routed via the modem card 70, an analogue card 68, a transmit/receive RF Unit 66, and then via the RF combiner shelf 42 before being transmitted from the central terminal antenna to the subscriber terminal over the wireless link.

The above description has discussed the general technique used to route an incoming call from a switch of a telecommunications network to a particular subscriber terminal. A similar process is employed in the reverse direction for outgoing calls from a subscriber terminal to the switch. In this instance, when the subscriber terminal contacts the central terminal to establish an outgoing call, then once the radio link is established the DTU 130 within the appropriate central terminal modem shelf accesses the database 180 to retrieve the necessary information (eg E1 time slot ID) to enable the call to be routed via the backhaul and the backplane to the correct E1 line to the switch. The information retrieved is then transmitted with the set up message to the CTU 120 to enable a call object to be created.

As mentioned earlier with reference to FIG. 3, element managers are used in preferred embodiments of the present invention to manage the wireless telecommunications system, and these element managers interface with the various equipment shelves of the telecommunications system via shelf controllers. Hence, an element manager can establish a connection with a shelf controller in order to perform management functions relating to telecommunications elements of the telecommunications system.

In accordance with preferred embodiments of the present invention, the telecommunications system maintains a hierarchical structure of objects in order to model the structure of the telecommunications system, and management of the telecommunications elements of the telecommunications system is preferably performed by appropriate manipulation of the corresponding objects within the hierarchical object structure.

The objects provided within the hierarchical structure can represent various entities. For example, an object may represent a telecommunications element of the telecommunications system. Further, an object may represent not only an element of the telecommunications system, but also an operation to be applied to that element. Additionally, other combinations of elements and/or operations may be represented by objects. For example, an object may represent a single element, and a group of operations to be applied to that element, or alternatively an object may represent a group of elements and an operation to be applied to that group of elements.

Thus, as an example, each of the databases 150, 180 may be represented by a database object, and indeed individual records within those databases may be represented by separate objects depending from the database object in the hierarchical structure. Additionally, certain objects may relate to a particular element of the telecommunications system, such as a disc storage device, and also define an operation to be applied to that element. Thus, for example, a single object may specify a particular disc storage device, and a write operation to be applied to that disc storage device.

As will be discussed in more detail later when describing the messages passed between the element manager and shelf controllers of the telecommunications system, the basic principle behind the communications between the element manager and the shelf controllers is that most operations should be considered as the transfer of an object from one side of the communications to the other. In preferred embodiments, all objects in the hierarchical structure are identified by a hierarchical addressing scheme. In accordance with the addressing scheme employed in preferred embodiments, each object has a Relative Distinguished Name (RDN) which includes a type attribute specifying an object type, and an instance attribute identifying the particular instance of that object type. Whilst the RDN provides a unique identifier for an object when viewed from its immediate superior, or parent, object in the object structure, there are likely to be objects having the same RDN within the entire object structure. Hence, to provide a unique identifier for a particular object, a Distinguished Name (DN) is defined, which is formed by the concatenation of all of the RDNs for each object instance in the containment path from the route object of the object structure to the object instance being identified.

As discussed earlier, an element manager can establish a connection with a shelf controller of the telecommunications system in order to perform management functions. Hence, an element manager 210 can establish a connection with a shelf controller 140 of the access concentrator 100 to perform management functions relating to the telecommunications elements provided within the access concentrator 100. Alternatively, the element manager 210, or indeed a different element manager, can establish a connection with the shelf controller 170 of a modem shelf 46 of the central terminal 10 in order to perform management functions relating to the telecommunications elements provided on that modem shelf.

Further, the telecommunications system of preferred embodiments provides a management time slot on each channel of the backhaul between the access concentrator 100 and the central terminal 10, and hence it is possible for the element manager 210 to connect to the shelf controller 140 of the access concentrator 100, but to initiate management functions to be performed within the modem shelf managed by the shelf controller 170. In such instances, the necessary information about the management functions is routed in packets over the appropriate backhaul management time slot from the shelf controller 140 to the shelf controller 170 to enable those management functions to be performed on that modem shelf. In preferred embodiments, the transport mechanism defined by the Q.921 standard is used to transfer this information between the element manager and the shelf controller 170. Each shelf controller has a Terminal Endpoint ID (TEI), and this TEI is associated with the information packets to ensure that the correct shelf controller receives those information packets.

Similarly, if the element manager 210 is connected to the shelf controller 170, management functions relating to the access concentrator 100 could be passed from the element manager 210 to the shelf controller 170, and then routed over the backhaul to the shelf controller 140 of the access concentrator 100.

Further, it should be noted that the above functionality is not merely limited to a single "hop" between a central terminal modem shelf and the access concentrator. For example, the element manager may connect to one modem shelf, and manage another modem shelf on a different central terminal by transfer of the information over the backhaul between the modem shelf (to which the element manager is connected) and the access concentrator, and then over another backhaul between the access concentrator and the modem shelf to be managed by the element manager.

In accordance with preferred embodiments of the present invention, the element manager 210 is provided with a management controller 220 for interfacing with the shelf controllers 140, 170 on telecommunications equipment such as the access concentrator 100 and a central terminal modem shelf 46. Communication between the management controller 220 of the element manager 210 and the shelf controller of the telecommunications equipment is effected via messages. Hence, within the management controller 220 of the element manager 210, a set of messages are defined, that may be sent over the interface between the management controller 220 and the shelf controller 140, 170. Similarly, each shelf controller 140, 170 will also have access to the same set of messages.

In preferred embodiments, the management controller 220 and shelf controllers 140, 170 include a software element for parsing each type of message, with the structure of each message being defined in the software code. However, alternatively, the set of messages could be defined in a storage accessible by the management controller 220, or shelf controllers 140, 170, for example internal memory of the element manager 210.

Various messages used in preferred embodiments to communicate between the management controller 220 of the element manager 210 and the shelf controller 140, 170 of the telecommunications system are illustrated in FIGS. 6A to 6F. These figures represent in tabular form the format of each message, with the width of the table representing a byte of information. Further, the syntax of the messages follows the general data format standards defined by the Q.931 standard.

Figure 6A:
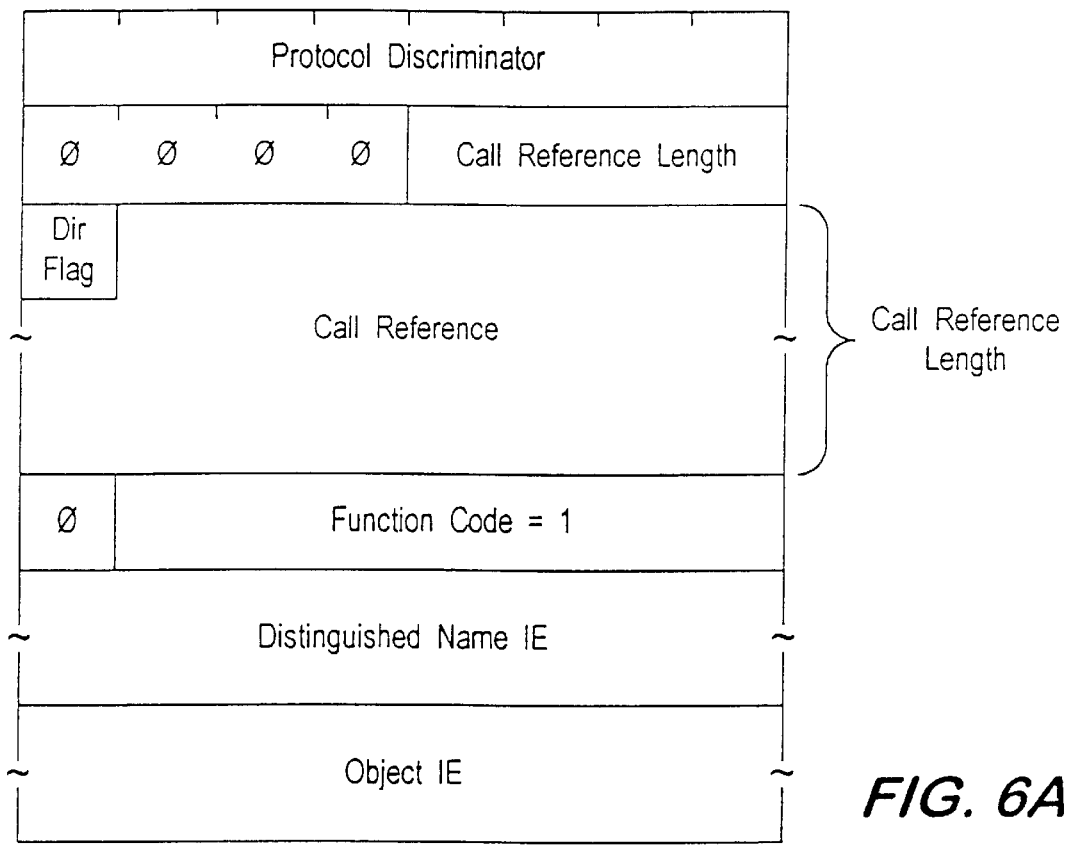
FIGS. 6A to 6F illustrate the format of the various messages used for management communications between the management system and the telecommunications system in accordance with preferred embodiments of the present invention.

FIG. 6A illustrates the format of a "Set" message that is issued by the management controller 220 in preferred embodiments to instruct the shelf controller 140, 170 to overwrite an object identified within the message with object data also defined in the message. The first byte of the Set message is used to identify a protocol discriminator as required by the Q.931 standard. In preferred embodiments, the protocol discriminator defines the set message as being part of a user defined message set. The same protocol discriminator is also included in the various other messages to be discussed below, to indicate that these messages are all part of the same user-defined message set. The last four bits of the second byte are used to identify the length in bytes of a call reference to be included within the message.

The call reference itself is then included within the message and takes up a number of bytes as specified by the call reference length. The call reference is assigned by the transmitter of the message, and any message returned in response to that message will also contain the same call reference. This hence enables a particular transaction to be identified.

Further, in preferred embodiments, a direction flag is associated with the call reference, this preferably having a single bit value. If the direction flag has a logic "0" value, then in preferred embodiments this indicates that the message is initiating a transaction. If the direction flag has a logic "1" value, this indicates the message is being returned in response to an earlier message having the same call reference.

A function code is also included in each message, and in preferred embodiments is specified by a seven bit value. If the function code has a value of "1", then this indicates that the message is a Set message.

The Set message also includes two information elements in addition to the above information. The first information element is a Distinguished Name information element that uniquely identifies the object to which the Set message is applicable. The second information element is an Object information element that contains object data to replace the current object data of the object identified by the Distinguished Name information element. The contents of these information elements will be discussed in more detail with reference to FIGS. 7A to 7D.

Figure 6B:
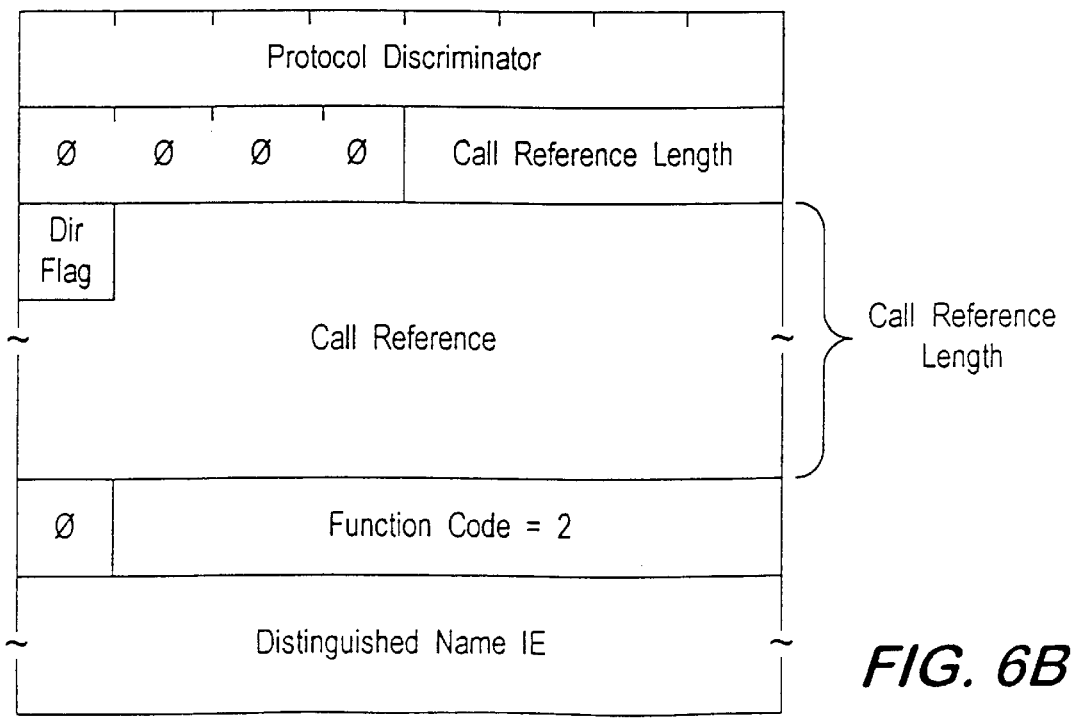

FIG. 6B illustrates the structure of a Get Request message which is used to request that an object be returned in response to the Get Request message, the particular object being identified within the message. As with the Set message, the Get Request message includes a protocol discriminator, a call reference length, a direction flag, a call reference and a function code. In this instance, the function code has a value of "2" to identify that the message is a Get Request message. The Get Request message also includes one information element, namely a distinguished name information element to identify the object that is being requested.

Figure 6C:
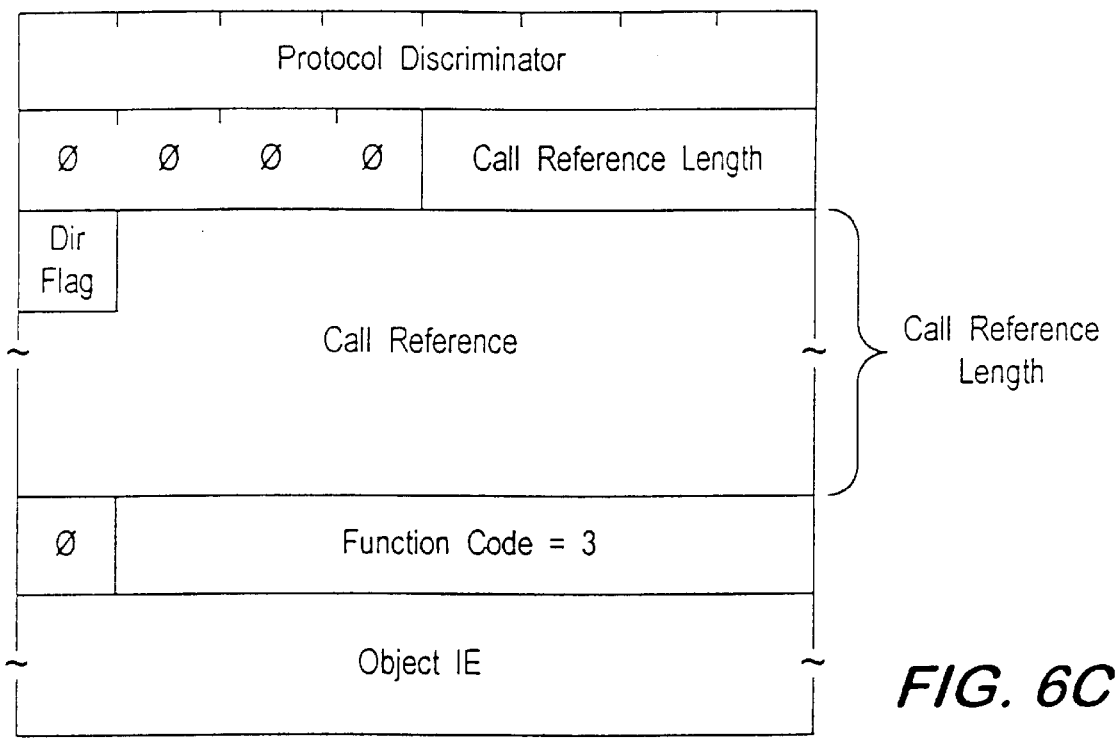

In response to a Get Request message, either a Get Result message (illustrated in FIG. 6C) or an Acknowledge message (illustrated in FIG. 6D) will be returned. The Get Result message is returned if the Get Request message is processed correctly. As illustrated in FIG. 6C, the Get Result message includes a protocol discriminator, a call reference length, a direction flag, a call reference, and a function code having the same formats as those illustrated earlier for the Set and the Get Request messages. In this instance, the function code has a value of "3" to identify that the message is a Get Result message. The Get Result message then includes a single information element, namely an object information element containing the data of the object requested.

Figure 6D:
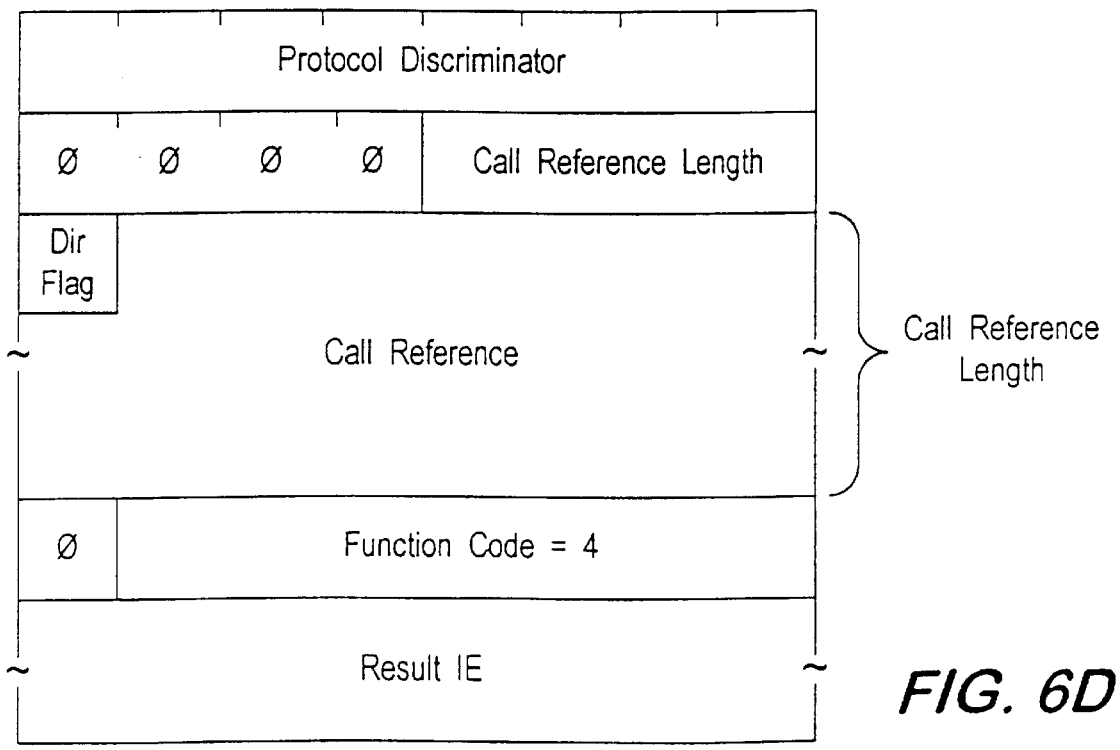

If for some reason, the Get Request message cannot be processed, then an Acknowledge message as illustrated in FIG. 6D is used. Again, the Acknowledge message includes a protocol discriminator, a call reference length, a direction flag, a call reference and function code, and in this instance the function code has a value of "4" to indicate that the message is an Acknowledge message. The Acknowledge message then includes a single information element, namely a Result information element. The Result information element includes a code identifying the reason why the Get Request message could not be processed, these codes being discussed in more detail later when describing the Result information element illustrated in FIG. 7C.

Figure 6E:
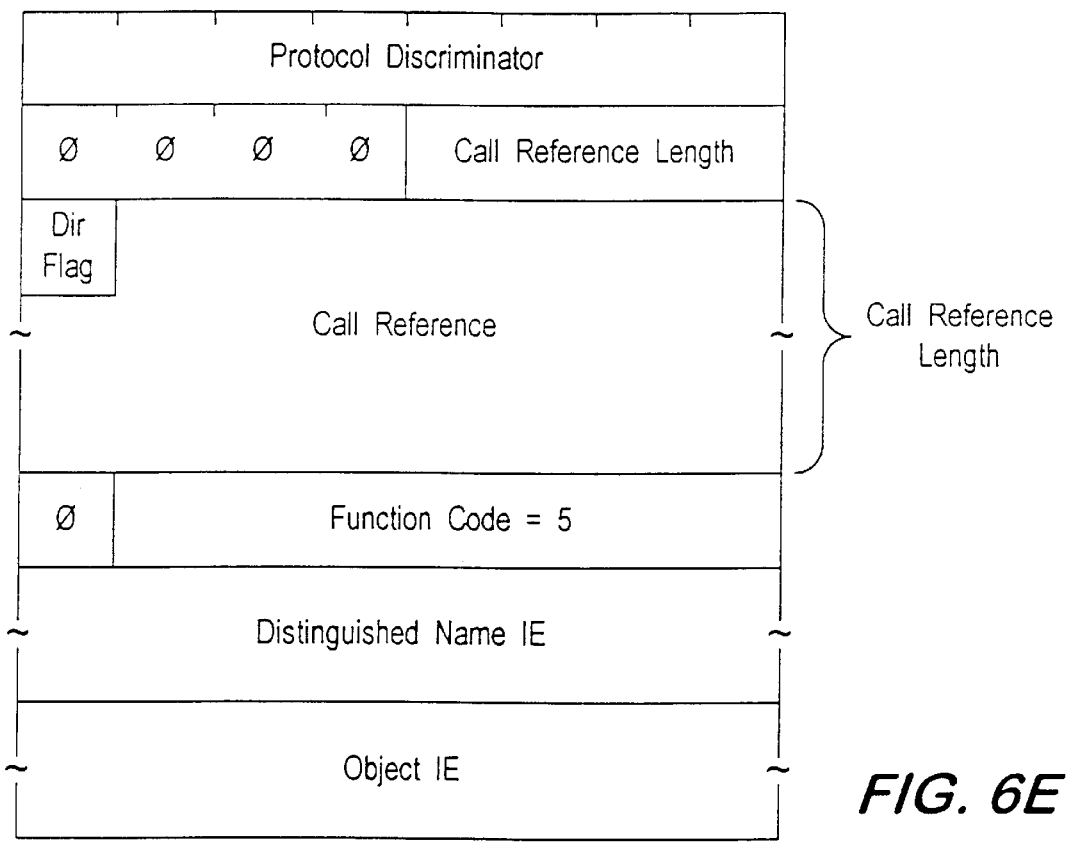

The Get Result message discussed earlier with reference to FIG. 6C is only issued in response to a Get Request message. However, in the preferred embodiments, there are certain instances in which the telecommunications system may wish to transmit objects to the element manager of its own volition. For example, in the event that an alarm is raised in connection with a particular element of the telecommunications system, then the telecommunications system may wish to send a corresponding object to the element manager to notify the element manager of that alarm. In such situations, an Unsolicited Get message is used, and the contents of the Unsolicited Get message are illustrated in FIG. 6E. This Unsolicited Get message has a similar format to the Get Result message, but in addition includes an extra information element, namely a Distinguished Name Information element, to identify the object whose data is included in the Object information element enclosed in the Unsolicited Get message. Since this Get message is unsolicited, it is clear that the Distinguished Name information element is required in order for the element manager to identify the object to which the object data in the Object information element relates. For these message, the function code has a value of "5" to indicate that the message is an Unsolicited Get message.

As will be discussed in detail later, in some instances, the Unsolicited Get message will be sent as a result of some ongoing operation that was started by a Set message, in which case the call reference within the Unsolicited Get message will be identical to that of the original Set message. However, for completely unsolicited objects, the Unsolicited Get message will have a zero call reference.

Figure 6F:
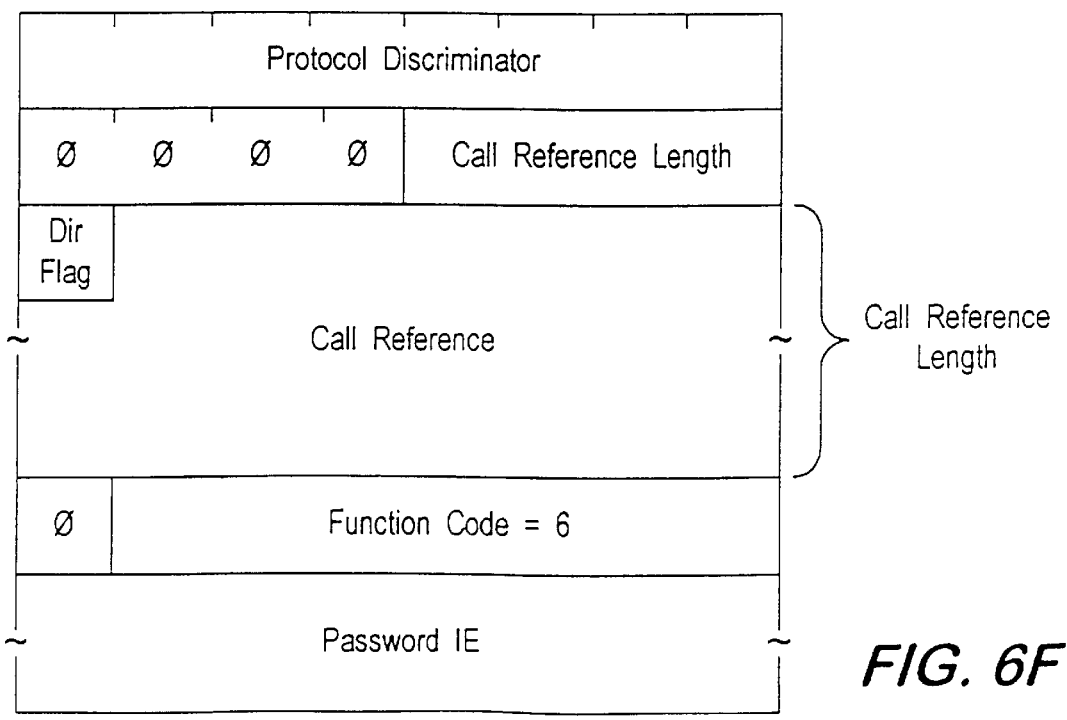

A further message that is provided in preferred embodiments of the present invention is a Login User message, illustrated in FIG. 6F. This message is used to enable a particular specified user to login, with any existing users being logged out. The Login User message, as with all of the other messages discussed, has a protocol discriminator, a call reference length, a direction flag, a call reference and a function code, in this instance the function code having a value of "6" to identify the message as a Login User message. Further, the Login User message has a Password information element which identifies a password string identifying the particular user seeking to login. In response to a Login User message, an Acknowledge message is returned, the Result information element of which identifying whether the login process has been successful, or why the login has been unsuccessful.

To enable a user to logout, the same Login User message is used in preferred embodiments, but in this instance a zero length password is specified. In accordance with the normal procedure employed in response to a Login User message, all existing users are logged out, and hence the current user is logged out. However, the zero length password results in no new user being logged in, thereby achieving the result of logging out the current user. Again, an Acknowledge message is returned to identify whether the Login User message has been processed correctly or not.

Having discussed the various messages stored within the memory 230 of the element manager 210, and within the memories 270, 280 accessible by the shelf controllers 140, 170, the information elements used within these various messages will now be described with reference to FIGS. 7A to 7D. Fields in the information elements may be fixed or variable length. In FIGS. 7A to 7D, fixed length fields are shown in the diagrams as the exact number of bytes. Variable length fields, which use the top bit of each byte as a continuation flag (1 for further bytes), are shown in the diagrams as a single byte, with a "0" in the top bit. It should be noted that, in accordance with preferred embodiments, a variable length field will have a maximum of four bytes, which, due to the presence of the continuation flag in each byte, corresponds to twenty-eight bits of valid information.

Figure 7A:
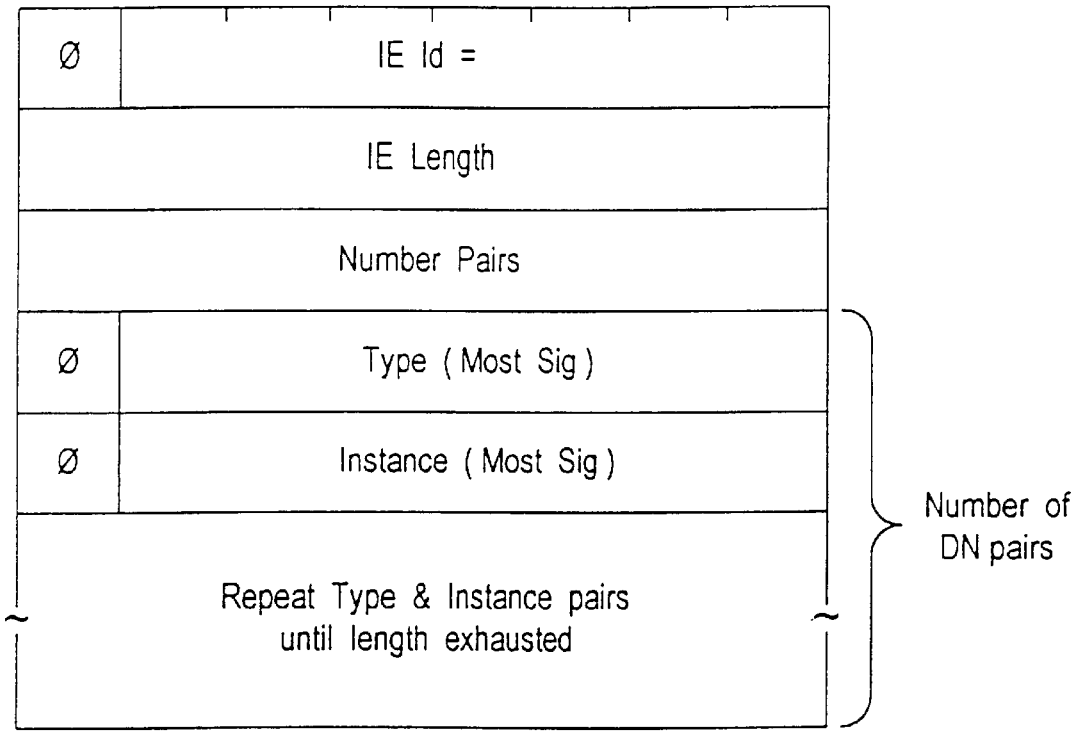
FIGS. 7A to 7D illustrate the format of the information elements contained within the messages illustrated in FIGS. 6A to 6F.

FIG. 7A illustrates the structure of the Distinguished Name information element. Firstly, a variable length field provides the information element ID, which in this instance will identify that the information element is a Distinguished Name information element. Then a fixed field of one byte is used to identify the length of the information element that follows, with another fixed field of one byte being used to identify the number of type and instance pairs that are to follow in the Distinguished Name information element. As mentioned earlier, a Distinguished Name identifying a particular object instance is formed by the concatenation of all of the Relative Distinguished Names for each object instance in the containment path from the root object to the object instance being identified. Each Relative Distinguished Name is identified by the combination of a type attribute specifying an object type, and an instance attribute identifying the particular instance of that object type. Hence, for each object instance in the containment path, there will be a type and an instance pair. Thus, the Distinguished Name information element includes a number of pairs of variable length fields, the first variable length field being arranged to identify each type and the second variable length field being arranged to identify each instance. Hence, starting with the most significant object instance in the containment path, in preferred embodiments this being the object immediately under the root object, the remainder of the Distinguished Name information element is taken up with type/instance pairs identifying each object instance in the containment path.

Figure 7B:
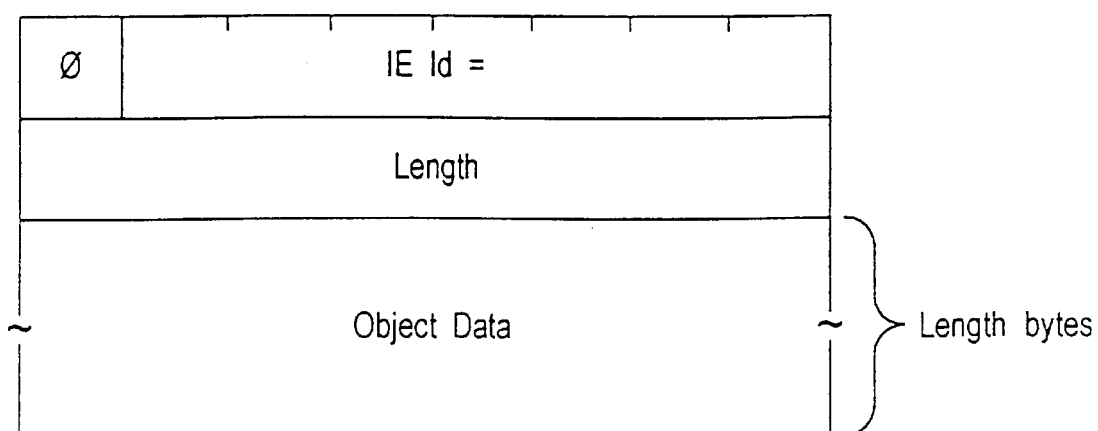

FIG. 7B illustrates the structure of the Object information element. As with the Distinguished Name information element, the Object information element includes a variable length field identifying an information element ID to indicate that the information element is indeed an Object information element. A fixed length field of one byte is then used to specify the length in bytes of the object data included within the Object information element. The Object information element then includes the object data itself, which takes up the number of bytes identified in the length field.

Figure 7C:
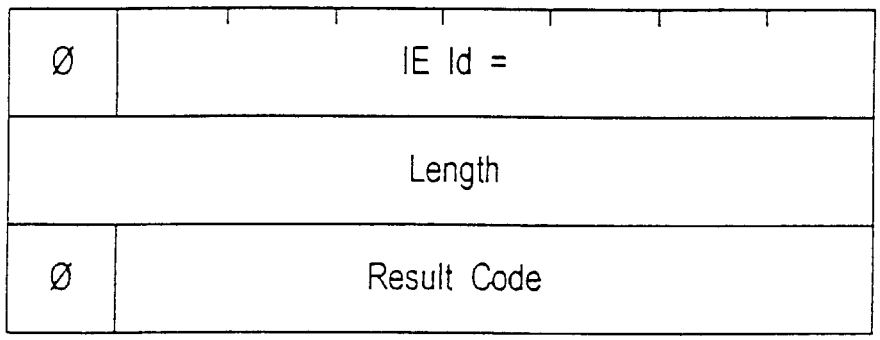

FIG. 7C illustrates the structure of the Result information element. As with the Object information element, the Result information element includes a variable length field providing the information element ID, followed by a fixed length field specifying the length of the result code included within the Result information element. The result code is a variable length field indicating how the message being acknowledged by the Acknowledge message has been processed. Six possible result codes used in preferred embodiments of the present invention are as follows:

0 EMID_RESULT_OK (indicates process completed correctly)
1 EMID_RESULT_UNKNOWNDN (Distinguished Name not known)
2 EMID_RESULT_BADPASSWORD (Password incorrect)
3 EMID_RESULT_INSUFFRIGHTS (user does not have necessary access rights)
4 EMID_RESULT_BADOBJECTSIZE (object size incorrect—object must be same size as one it is overwriting)
5 EMID_RESULT_OUTOFSEQUENCE (relevant to processes such as s/w download, where messages must be processed in sequence)
6 EMID_RESULT_UNKNOWNMSG (instance of message is not recognised)

Figure 7D:
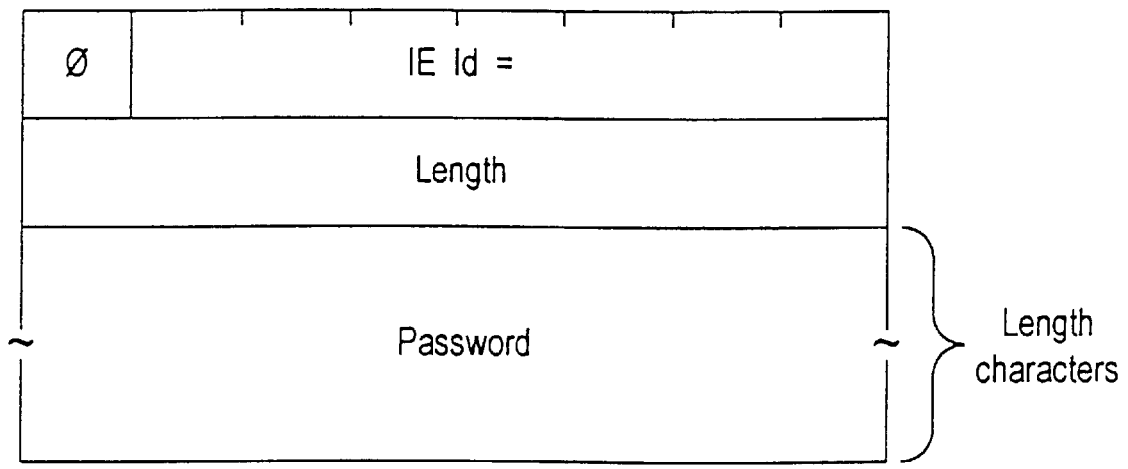

FIG. 7D illustrates the Password information element contained within the Login User message. This Password information element has a variable length field specifying the information element ID, followed by a fixed length field specifying the length of the password included within the Password information element. The password is then included within the Password information element.

By employing the above described set of messages, a simple interface mechanism is established between the element manager and the shelf controllers of the telecommunications system. Furthermore, the interface is generic, in that it is independent of the particular management functions that need to be performed on any particular telecommunications system. For example, FIG. 8 is an interaction diagram that illustrates how the above described simple set of messages can be used to perform a software download function in preferred embodiments of the present invention.

To begin the software download function, the management controller 220 of the element manager 210 issues a Set message to the shelf controller 140, the Distinguished Name information element within this Set message identifying an EXEMAN_OPEN object, and the Object information element identifying the object data to be associated with the EXEMAN_OPEN object. The EXEMAN_OPEN object identifies an executable manager, and an open command to be applied by that executable manager. Hence, upon receiving the Set message, the shelf controller 140 executable manager to open a file specified within the object data of the Object information element.

Then, the shelf controller 140 issues an Unsolicited Get message back to the management controller 220, this unsolicited Get message identifying in its Distinguished Name information element an EXEMAN_PROGRESS object. The Object information element of the Unsolicited Get message then includes the object data to be associated with the EXEMAN_PROGRESS object. This EXEMAN_PROGRESS object is used to provide a progress report on the operation of the executable manager, and hence the object data in the Object information element of the Unsolicited Get message will identify whether the executable manager has been able to process the open command correctly.

Figure 8:
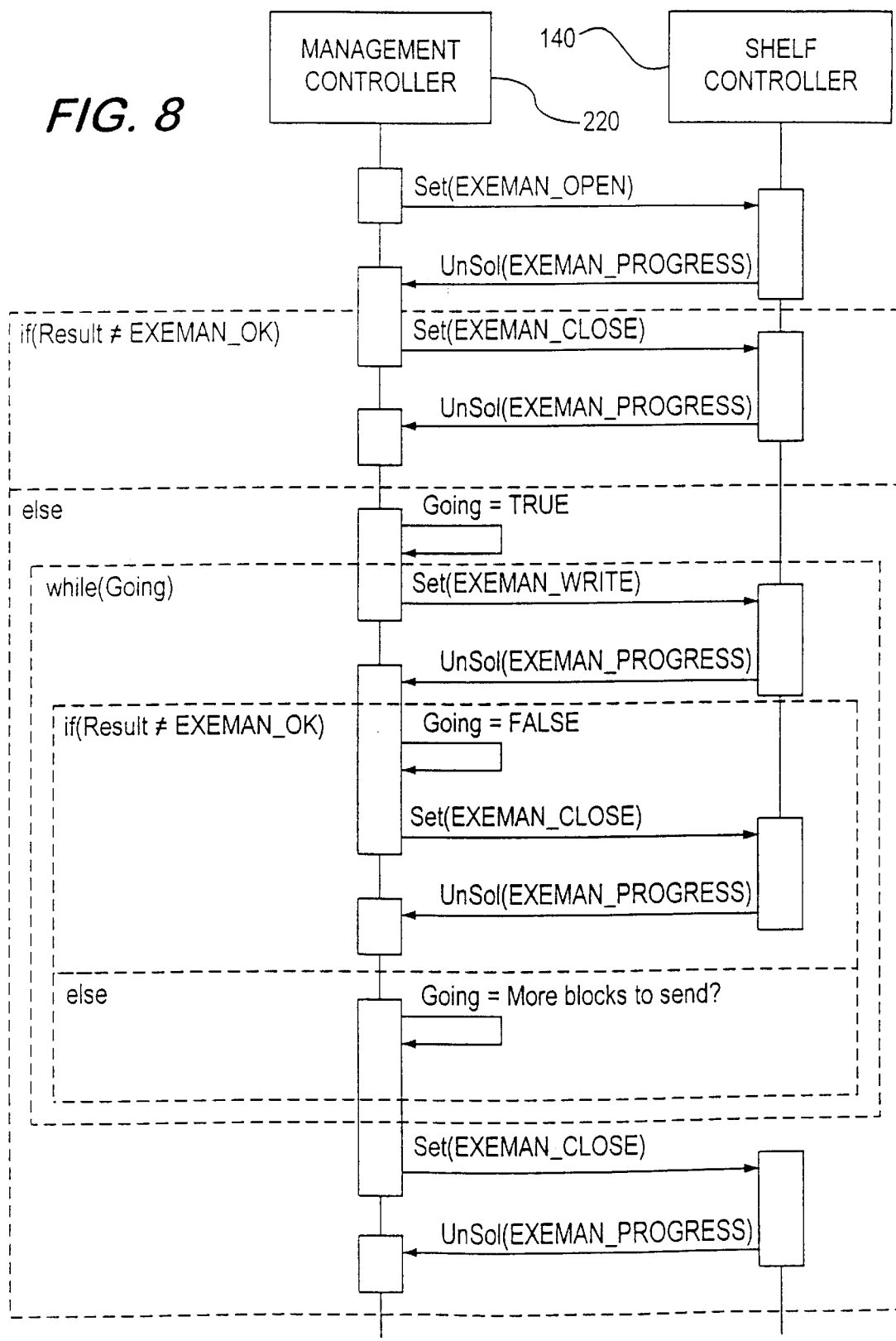
FIG. 8 is an interaction diagram illustrating the sequence of messages passed between the management controller of the management system and a shelf controller of the telecommunications system in order to perform a software download function in accordance with preferred embodiments of the present invention.

If for any reason the data returned in the Unsolicited Get message indicates that the executable manager has not been able to open the file, then, as illustrated in FIG. 8, the management controller 220 is arranged to send a further Set message, identifying an EXEMAN_CLOSE object. This will cause the shelf controller 140 to instruct the executable manager to close the file, and the shelf controller 140 will then issue an unsolicited Get message back to the management controller, enclosing the EXEMAN_PROGRESS object to confirm whether the close command has been processed correctly.

However, assuming the original Unsolicited Get message sent in response to the Set(EXEMAN_OPEN) message indicated that the open command had been processed correctly, the management controller sets a "Going" flag to true, and then is arranged to send a Set message to the shelf controller 140 containing an EXEMAN_WRITE object. The Object information element within the Set message will include a block of data to be written into the file previously opened. The EXEMAN_WRITE object identifies the executable manager, and a write command, and the shelf controller 140 will respond to the EXEMAN_WRITE object by causing the executable manager to write the data identified within the EXEMAN_WRITE object into the file already opened. The shelf controller 140 will then return an Unsolicited Get message to the management controller enclosing the EXEMAN_PROGRESS object which will identify the status of the write command.

If for any reason the EXEMAN_PROGRESS object indicates that the write command has not been processed correctly, then the "Going" flag is set to false and a Set message is issued by the management controller 220 to the shelf controller 140, enclosing an EXEMAN_CLOSE object, in order to cause the executable manager to close the file. Then, the shelf controller 140 will return an Unsolicited Get message to the management controller 220, enclosing the EXEMAN_PROGRESS object, to confirm whether the close command has been completed successfully. However, assuming that the write command has been processed correctly, then it is determined whether there are any more blocks of data to be sent to the shelf controller for writing into the opened file, and if so, further Set messages, including the EXEMAN_WRITE object specifying the data block (s) to be written, are sent to the shelf controller 140.

When there are no further blocks of data to be sent, then the management controller 220 is arranged to send a Set message, including the EXEMAN_CLOSE object, which will cause the executable manager to close the identified file. The shelf controller 140 will then return an unsolicited Get message to the management controller 220, including the EXEMAN_PROGRESS object, to confirm whether the close command has been processed correctly.

Hence, it can be seen from FIG. 8 that a software download procedure can be performed using only the small set of messages defined earlier. Indeed, for software download, only the Set message and Unsolicited Get message are actually required. Whilst software download has been discussed as one example of a complex procedure which can be effected using the simple interface mechanism described earlier, it will be appreciated by those skilled in the art that there are many other management functions which can also be handled in this way. For example, various line testing procedures can also be performed using the simple message set discussed earlier.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A management system for a telecommunications system, the telecommunications system having a plurality of objects representing elements of the telecommunications system or operations that are applied to those elements, at least one of the plurality of objects representing an element of the telecommunications system and an operation to be applied to that element, the management system comprising:

a management controller connected to an item of telecommunications equipment of the telecommunications system for passing messages over a communications link between the management controller and a management element of the telecommunications system to invoke management operations;

a set of messages which are generated by the management controller or the management element for passing over the communications link to invoke corresponding management operations, each message being arranged to include one or more information elements referenced when processing the message, at least a first message in the set being arranged to include an information element identifying one of said objects;

the management element being arranged, upon receipt of said first message, to cause the corresponding management operation to be invoked unless the object specified in that message represents an element of the telecommunications system and an operation to be applied to that element, in which event the management element causes a management operation to be invoked which is dependent on the operation represented by that object, whereby the first message is used to invoke different management operations dependent on the object identified in the first message.

2. A management system as claimed in claim 1, wherein the first message is arranged to include two information elements, a first information element identifying a particular object from said plurality of objects, and the second information element identifying object data to replace corresponding object data in the particular object, and the corresponding management operation causes the object data in the second information element to be written to the particular object.

3. A management system as claimed in claim 1, wherein a second message in the set is arranged to include an information element identifying one of said plurality of objects, receipt of the second message causing the identified object to be retrieved and output as an information element within a third message in the set.

4. A management system as claimed in claim 2, wherein a fourth message in the set is issued to acknowledge receipt of a message passed over the communications link.

5. A management system as claimed in claim 4, wherein the fourth message is issued if the message to be acknowledged by the fourth message could not be processed correctly, the fourth message including as an information element an indication of the processing problem.

6. A management system as claimed in claim 1, wherein the management controller is connected to a first item of telecommunications equipment of the telecommunications system, and the management element of the telecommunications system resides on a second item of telecommunications equipment, and the messages are routed to and from the management element via a connection medium of the telecommunications system connecting the first and second items of telecommunications equipment.

7. A management system as claimed in claim 6, wherein the connection medium is a backhaul used to transfer telecommunications signals between the first and second items of telecommunications equipment, a management slot being provided on the backhaul to facilitate transfer of the messages between the management element and the first item of telecommunications equipment.

8. A telecommunications system, comprising:

a storage for maintaining a plurality of objects representing elements of the telecommunications system or operations that are applied to those elements, at least one of the plurality of objects representing an element of the telecommunications system and as an operation to be applied to that element;

a management element for communicating over a communications link with a management controller to enable management operations to be invoked; and a management controller connected to an item of telecommunications equipment of the telecommunications system for passing messages over a communications link between the management controller and a management element of the telecommunications system to invoke management operations;

a set of messages which are generated by the management controller or the management element for passing over the communications link to invoke corresponding management operations, each message being arranged to include one or more information elements referenced when processing the message, at least a first message in the set being arranged to include an information element identifying one of said objects;

the management element being arranged, upon receipt of said first message, to cause the corresponding management operation to be invoked unless the object specified in that message represents an element of the telecommunications system and an operation to be applied to that element, in which event the management element causes a management operation to be invoked which is dependent on the operation represented by that object, whereby the first message is used to invoke different management operations dependent on the object identified in the first message.

9. A telecommunications system as claimed in claim 8, wherein the management element is a shelf controller provided within an item of telecommunications equipment to manage operation of a shelf of telecommunications components.

10. A telecommunications system as claimed in claim 8, wherein wireless links are employed to route telecommunications signals between at least some of the items of telecommunications equipment of the telecommunications system.

11. A method of managing a telecommunications system, the telecommunications system having a plurality of objects representing elements of the telecommunications system or operations that are applied to those elements, at least one of the plurality of objects representing an element of the telecommunications system and as an operation to be applied to that element, the method comprising the steps of:

connecting a management controller to an item of telecommunications equipment of the telecommunications system;

selecting a message from a set of messages which are generated by the management controller or a management element of the telecommunications system for passing over a communications link to invoke corresponding management operations, each message in the set of messages being arranged to include one or more information elements referenced when processing the message, at least a first message in the set being arranged to include an information element identifying one of said objects;

passing the selected message over the communications link between the management controller and the management element of the telecommunications system to invoke a management operation; and invoking the management operation, wherein, upon receipt of said first message by the management element, the invoking step involves causing the corresponding management operation to be invoked unless the object specified in that message represents an element of the telecommunications system and an operation to be applied to that element, in which event the invoking step involves causing a management operation to be invoked which is dependent on the operation represented by that object, whereby the first message is used to invoke different management operations dependent on the object identified in the first message.

12. A method as claimed in claim 11, wherein the first message of said set of messages is arranged to include two information elements, a first information element identifying a particular object from said plurality of objects, and the second information element identifying object data to replace corresponding object data in the particular object, and the corresponding management operation causes the object data in the second information element to be written to the particular object.

\* \* \* \* \*